Feb. 7, 1967  C. C. CAMPBELL, JR., ET AL  3,303,304
DISCRETE LOCAL ALTITUDE SENSING DEVICE
Filed Dec. 23, 1965
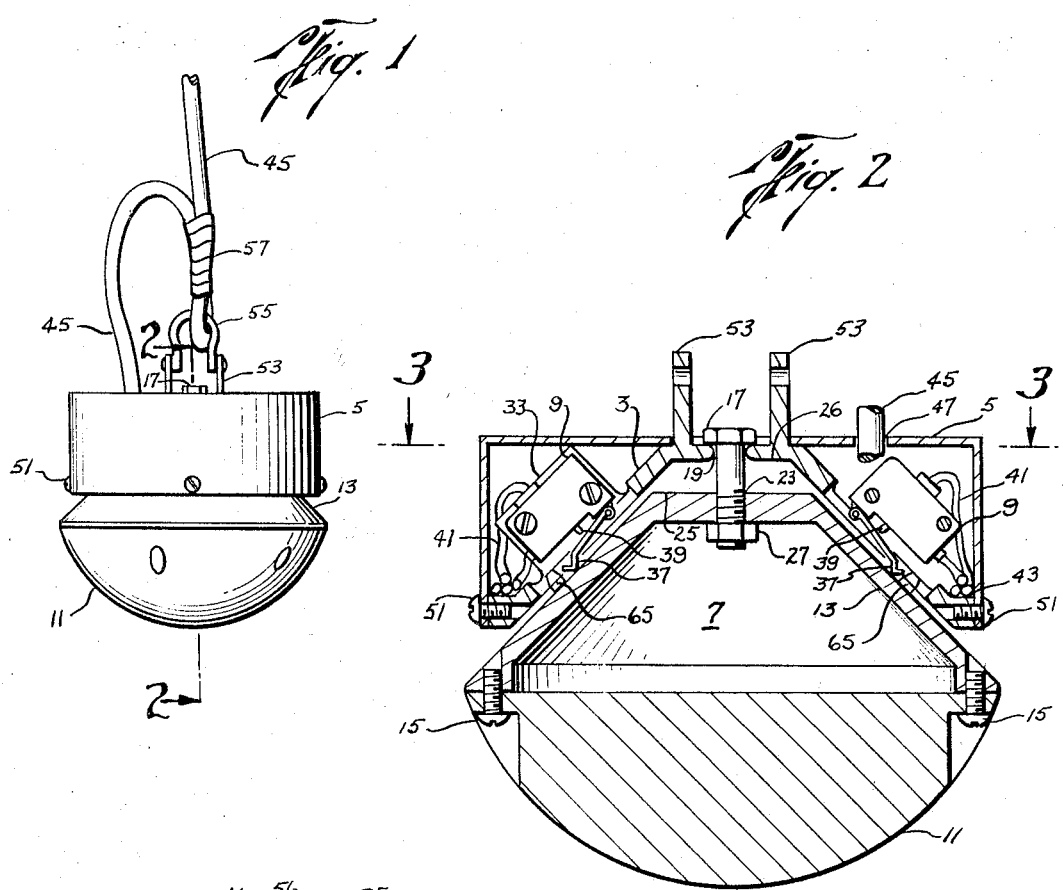
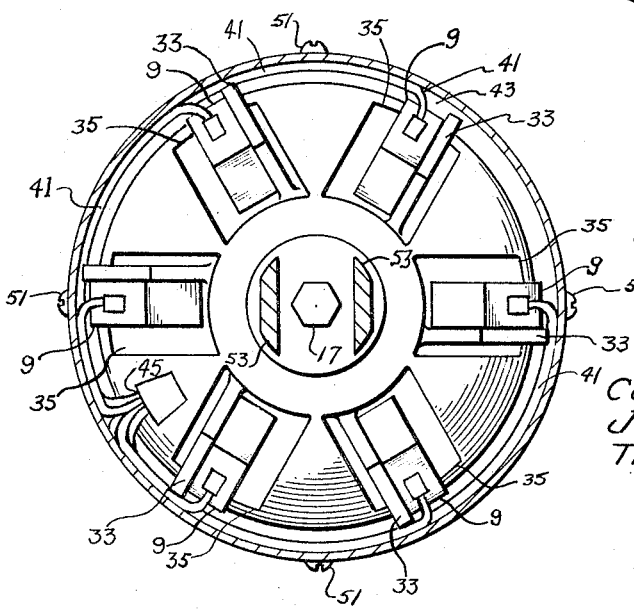
Carlisle C. Campbell, Jr.
Joseph A. Chandler
Thomas M. Grubbs
INVENTORS
BY 9†mcCoy
Bernard A. Reiter
ATTORNEYS

United States Patent Office 3,303,304
Patented Feb. 7, 1967

3,303,304
DISCRETE LOCAL ALTITUDE SENSING DEVICE
Carlisle C. Campbell, Jr., 212 Confederate Way, Seabrook, Tex. 77586; Joseph A. Chandler, 3030 Longwood, Dickinson, Tex. 77539; and Thomas M. Grubbs, 9905 Tiltree, Houston, Tex. 77034
Filed Dec. 23, 1965, Ser. No. 516,159
3 Claims. (Cl. 200—61.45)

The invention described herein may be manufactured and used by or for the Government of the United States of America for governmental purposes without the payment of any royalties thereon or therefor.

This invention relates to sensing devices in general but more particularly to an altitude sensor for use with a space vehicle.

The safe descent to a landing surface by a manned vehicle requires that its vertical component of velocity be reduced to approximately eight (8) to ten (10) ft. per second, particularly if it is to descend on a hard surface such as land, rather than water. In order to reduce the descent velocity to within this general range, a system of parachutes, automatically released for deployment by a baro-switch or similar type device is generally used. However, with the advent of larger space vehicles it is desirable to have in addition to the parachutes, a braking system usable for land or water descents, which insures that impact forces upon landing will be within the known limits of safety. One of the systems proposed for this purpose employs a plurality of retrorockets affixed to the vehicle with the nozzles pointed toward the impact surface so that the rocket thrust vector acts opposite to that of the vehicle's velocity vector. Immediately prior to impact, the rockets may be actuated so as to reduce vehicle velocity thereby reducing impact forces to within the range endurable by its occupants or cargo.

Of fundamental importance to the velocity deceleration solution described above is the device which senses and signals the retrorocket system prior to impact. Such a device must be extremely accurate, responsive, and of obvious high reliability. For example, a vehicle descending by parachute at the rate of 30 feet per second must, at an altitude of about ten (10) feet be braked by the retrorocket system to about one third its velocity. The retrorockets, which fire effectively for a period of less than one (1) second, therefore must reduce velocity of the vehicle to less than ten (10) feet per second before or at the time it comes in contact with the impact surface. It is apparent that a mere fraction of a second prematurity or delay in firing of the system easily spells the difference between success or failure of the landing.

In view of the discussion above, the present invention is directed to a sensing mechanism capable of detecting a predetermined dicrete local altitude and of instantaneously transmitting a firing signal to the vehicle retrorocket system. Upon receipt of the signal the rocket system is ignited and the thrust therefrom reduces vehicle velocity to within the desired range. Due to the positive contact design of the sensor, premature actuation of the rockets caused by vehicle oscillation or wind loads is substantially eliminated. In addition, a hemispherically shaped head is provided on the sensor which insures instantaneous actuation at all angles of impact. Also, the impact force necessary to close the actuation switches may be varied, thus enabling use of the sensor on a variety of surface hardnesses such as land, water, or sand. Due to the simplicity of its construction and independence of all external factors such as atmospheric pressure, initiating electrical signals, or human monitors, the sensor is reliable under the most adverse conditions. In addition to those obvious advantages, it is light (weighing generally less than 5 lbs.) and compact in size (approximately 4" x 4" x 6"), both of these factors making the device particularly adaptable for use on a spacecraft or other vehicle having stringent subsystem weight and size limitations.

Other advantages and features of the invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a perspective view of the sensing device of the invention;

FIG. 2 is a sectional view along the axis 2—2 of FIG. 1; and

FIG. 3 is a sectional view along the axis 3—3 of FIG. 2, showing the switch frame and miniature snap action switches supported thereon.

The altitude sensor of the invention includes, as best shown in FIGS. 1 and 2, the conically shaped switch frame 3, a cover member 5 which is affixed over the switch frame, and the bumper means 7 which is in operative communication with a plurality of switches 9 supported on the switch frame. The bumper means 7 includes a lower hemispherically shaped bumper element 11 fixedly connected to the freely hanging inner cone member 13 by a series of round head machine screws 15 which are inserted through and recessed in the bumper element 11. The inner cone member 13 is supported from switch frame 3 by means of the bolt 17 which extends through circular chamfered hole 19 in the frame. The bolt is fitted through threaded aperture 23 in the upper horizontal section 25 of inner cone member 13. Lock nut 27 is threaded on the bolt within the inner cone member so as to thereby support the latter in hanging relation from the frame 3 while also permitting swinging movement therein. It is thus apparent that the inner cone member and attached bumper element is movable not only in a vertical direction into engagement with the switch frame 3 but also is rotatable and angularly displaceable with respect thereto. It will also be recognized that the distance between the upper horizontal surfaces 25 of inner cone member 13 and lower horizontal surface 26 of switch frame 3 is critical since the miniature snap action switches 9 would be constantly tripped if the distance was too small. Conversely they would not trip at all if the distance were too great since member 13 would likely engage switch frame 3 without contacting a switch. By use of the threaded connection between bolt 17, aperture 23, and lock nut 27, this distance may be adjusted to vary the amount of movement by bumper element 11 necessary to close the actuator arms 37 of the switches. It may be desirable for example, if the vehicle is to land on water to shorten the distance, thus making the device more sensitive to the softer landing surface. Also, in this regard the bumper means 7 is generally made of relatively lightweight material, such as aluminum, by comparison to switch frame 3 since impact on a softer surface such as water or fine porous sand may not otherwise raise the former into immediate contact with a switch. By contrast the switch frame 3 is generally made of a heavier material, such as stainless steel, so that descent onto a surface would more quickly bring it down on the bumper element thereby closing at least one of the switches 9.

Fixedly connected to switch frame 3 is a plurality of conventional miniature snap action switches 9. The switches, which are preferably six in number, are circumferentially spaced thereabout and are affixed each to extending upwardly directed flanges 33 which are integral with the switch frame (see FIG. 3). Adjacent to each of the flanges is a rectangularly shaped aperture 35 over which the switches lie and through which each switch actuator arm 37 extends (FIG. 2. Force on any one of the arms by the bumper element will compress a contact button 39 which closes the circuit thereby allowing transmission of a current which ignites the retrorocket system. In order to dampen vibrations occurring during descent which might prematurely close a switch, a resilient dampening body 65, such as soft rubber or other appropriate material, may be affixed to the frame adjacent each switch. By equidistant circumferential spacing of the switches, movement of the bumper element 11 in substantially any direction would close a switch thereby transmitting the actuating electrical signal. The lead wires 41 from each switch are dressed-down along circumferential flange 43 of the switch frame and brought to the position of the common conduit 45. The common conduit extends through hole 47 in cover member 5 which is affixed, by round head screws 51, over the switches and associated circuitry to the switch frame. Since the conduit 45 acts also as the support for the sensor from the vehicle, it is looped through the pivoted horseshoe 55 affixed to arms 53 on the switch frame. The conduit is taped as at 57 in the manner shown so that the forces of deployment may not be transmitted to the lead wires 41 and their connections to their respective switches.

The sensor may be deployed from the vehicle at an appropriate time either automatically or manually after the parachutes have opened. This may be done by merely dropping it from beneath the vehicle and allowing deployment forces to be absorbed by the aforementioned conduit. The particular length of the conduit will depend upon the altitude at which it is desired to actuate the retrorockets. Upon impact with the landing surface the bumper element 11 will, as previously explained, depress at least one or several of the switches thus closing the circuit and transmitting a signal to ignite the retrorockets.

It should be understood that the foregoing disclosure relates only to a preferred embodiment of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. An altitude sensing device for energizing a braking system on a descending vehicle at a discrete local altitude above an impact surface, said device comprising:
  a frame member having electrical switch means affixed thereto in normally open condition but in operative association with the braking system and with a bumper element;
  a bumper element for closing said normally open switch means upon contact of said element with the impact surface; and
  means movably affixing said bumper element to said frame member in adjacent relation to said switch means so that impact force on said bumper element causes it to close said switch means thereby actuating the braking system,
  said switch means having an extended actuator arm affixed thereto;
  an aperture in said frame member for receiving the actuator arm of said switch means therethrough; and
  said bumper element disposed on the side of the apertured frame member through which said actuator arm extends and in adjacent relationship to said extending arm so that impact force on said bumper element moves it against said actuator arm, thereby closing the switch.

2. An altitude sensing device for energizing a braking system on a descending vehicle at a discrete local altitude above an impact surface, said device comprising:
  a frame member having electrical switch means affixed thereto in normally open condition but in operative association with the braking system and with a bumper element;
  a bumper element for closing said normally open switch means upon contact of said element with the impact surface;
  means movably affixing said bumper element to said frame member in adjacent relation to said switch means so that impact force on said bumper element causes it to close said switch means thereby actuating the braking system, said frame member having a sloped surface for receiving said bumper element and guiding it into closing contact with said normally opened switch means;
  said bumper element having a sloped surface substantially complementary to the sloped surface of said frame member but in adjacent spaced relation thereto so that pressure on said bumper element from any of substantially an infinite number of angles causes said switch means to close;
  said switch means including a plurality of switches, each said switches having an extending actuator arm thereon;
  said sloped surface of said frame member having a plurality of spaced apertures, each for receiving a switch actuator arm therethrough; and
  said bumper element disposed on the side of said apertured frame member through which said actuator arms extend and in adjacent relationship thereto so that impact forces on said bumper element moves it against at least one of said actuator arms, thereby closing at least one of said switches.

3. An altitude sensing device for energizing a braking system on a descending vehicle at a discrete local altitude above an impact surface, said device comprising:
  a frame member having electrical switch means affixed thereto in normally open condition but in operative association with the braking system and with a bumper element;
  a bumper element for closing said normally open switch means upon contact of said element with the impact surface;
  means movably affixing said bumper element to said frame member in adjacent relation to said switch means so that impact force on said bumper element causes it to close said switch means thereby actuating the braking system;
  said frame member having a sloped surface for receiving said bumper element and guiding it into closing contact with said normally open switch means;
  said bumper element having a sloped surface substantially complementary to the sloped surface of said frame member but in adjacent spaced relation thereto so that pressure on said bumper element from any of substantially an infinite number of angles causes said switch means to close;
  said switch means including a plurality of switches, each said switches having an extending actuator arm thereon;
  said sloped surface of said frame member having a plurality of spaced apertures for receiving each switch actuator arm therethrough;
  said bumper element disposed on the side of said apertured frame member through which said actuator arms extend and in adjacent relationship thereto so that impact forces on said bumper element moves it against at least one of said actuator arms thereby closing at least one of said switches;

said bumper element including first and second portions, said first portion disposed adjacent said switch frame and adapted to contact said plurality of switches, and said second portion having a convex external surface so as to positively receive angularly directed impact forces.

References Cited by the Examiner
UNITED STATES PATENTS

| | | | |
|---|---|---|---|
| Re. 25,764 | 4/1965 | Robinson | 200—61.44 |
| 2,492,501 | 12/1949 | Robins | 244—138 |

References Cited by the Applicant
UNITED STATES PATENTS

| | | |
|---|---|---|
| 2,055,153 | 3/1913 | Ferguson. |
| 2,352,692 | 7/1944 | Dann. |
| 2,507,986 | 5/1950 | Liss. |
| 2,916,287 | 12/1959 | Davey. |
| 2,930,549 | 3/1960 | Ernst. |
| 3,128,970 | 4/1964 | Tinajero. |
| 3,154,265 | 10/1964 | Hendrix et al. |

BERNARD L. GILHEANY, *Primary Examiner.*

J. J. BAKER, *Assistant Examiner.*

UNITED STATES PATENT OFFICE
CERTIFICATE OF CORRECTION

Patent No. 3,303,304                      February 7, 1967

Carlisle C. Campbell, Jr., et al.

It is hereby certified that error appears in the above numbered patent requiring correction and that the said Letters Patent should read as corrected below.

In the heading to the printed specification, lines 3 to 6, for "Carlisle C. Campbell, Jr., 212 Confederate Way, Seabrook, Tex. 77586; Joseph A. Chandler, 3030 Longwood, Dickinson, Tex. 77539; and Thomas M. Grubbs, 9905 Tiltree, Houston, Tex. 77034" read -- Carlisle C. Campbell, Jr., Seabrook, Tex. , Joseph A. Chandler, Dickinson, Tex., and Thomas M. Grubbs, Houston, Tex., assignors to the United States of America as represented by the Administrator of the National Aeronautics and Space Administration --.

Signed and sealed this 17th day of October 1967.

(SEAL)
Attest:

EDWARD M. FLETCHER, JR.
Attesting Officer

EDWARD J. BRENNER
Commissioner of Patents